US010292122B2

(12) United States Patent
Liu et al.

(10) Patent No.: US 10,292,122 B2
(45) Date of Patent: May 14, 2019

(54) METHOD AND ACCESS POINT FOR MAINTAINING SYNCHRONIZATION AMONG ACCESS POINTS IN RADIO ACCESS NETWORK

(71) Applicant: Telefonaktiebolaget LM Ericsson (publ), Stockholm (SE)

(72) Inventors: Jinhua Liu, Beijing (CN); Gen Li, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 15/512,915

(22) PCT Filed: Oct. 11, 2014

(86) PCT No.: PCT/CN2014/088364
§ 371 (c)(1),
(2) Date: Mar. 21, 2017

(87) PCT Pub. No.: WO2016/054820
PCT Pub. Date: Apr. 14, 2016

(65) Prior Publication Data
US 2017/0303219 A1    Oct. 19, 2017

(51) Int. Cl.
*H04W 72/04* (2009.01)
*H04W 84/12* (2009.01)
(Continued)

(52) U.S. Cl.
CPC .......... *H04W 56/001* (2013.01); *H04L 5/0032* (2013.01); *H04W 56/0015* (2013.01);
(Continued)

(58) Field of Classification Search
CPC .......... H04W 56/001; H04W 72/0453; H04W 72/0446; H04W 56/0015
See application file for complete search history.

(56) References Cited

U.S. PATENT DOCUMENTS

2008/0232517 A1*  9/2008  Terabe .................. H04L 5/0053
                                                            375/344
2010/0260168 A1  10/2010  Gheorghiu et al.
(Continued)

FOREIGN PATENT DOCUMENTS

CN    101123465    2/2008
CN    102090118    6/2011
(Continued)

OTHER PUBLICATIONS

Extended European Search Report for Application No. / Patent No. 14903608.9-1219 / 3205157 PCT/CN2014088364 —dated May 11, 2018.
(Continued)

*Primary Examiner* — Mohammad S Anwar
(74) *Attorney, Agent, or Firm* — Baker Botts, LLP (57) ABSTRACT

The present disclosure provides a method implemented in an access point, AP, for maintaining synchronization among APs in a radio access network as well as the AP. The method comprises at least one of a transmission step and a reception step. At the transmission step, a first inter-AP synchronization signal is transmitted to a first neighboring AP, which synchronizes to the AP, at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP, wherein the reception resource indicated by the second synchronization signal transmission/reception (Continued)

pattern overlaps with the transmission resource indicated by the first synchronization signal transmission/reception pattern. At the reception step, a second inter-AP synchronization signal is received from a second neighboring AP, to which the AP synchronizes, at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP, wherein the reception resource indicated by the first synchronization signal transmission/reception pattern overlaps with the transmission resource indicated by the third synchronization signal transmission/reception pattern.

10 Claims, 7 Drawing Sheets

(51) Int. Cl.
*H04W 56/00* (2009.01)
*H04L 5/00* (2006.01)
(52) U.S. Cl.
CPC ... *H04W 72/0426* (2013.01); *H04W 72/0446* (2013.01); *H04W 72/0453* (2013.01); *H04W 84/12* (2013.01)

(56) References Cited

U.S. PATENT DOCUMENTS

| | | | | |
|---|---|---|---|---|
| 2010/0296491 | A1* | 11/2010 | Wang | H04J 3/0638 370/336 |
| 2013/0182630 | A1* | 7/2013 | Yamamoto | H04J 11/0073 370/312 |
| 2014/0204809 | A1* | 7/2014 | Kim | H04J 13/0062 370/280 |

FOREIGN PATENT DOCUMENTS

| | | |
|---|---|---|
| CN | 102160433 | 8/2011 |
| EP | 2 066 067 A1 | 6/2009 |
| EP | 2 487 972 A1 | 8/2012 |
| JP | 06276126 | 9/1994 |
| WO | WO 2011097771 | 8/2011 |

OTHER PUBLICATIONS

PCT Notification of Transmittal of the International Search Report and the Written Opinion of the International Searching Authority, or the Declaration for International application No. PCT/CN2014/088364—dated May 27, 2015.

* cited by examiner

Fig. 7

METHOD AND ACCESS POINT FOR MAINTAINING SYNCHRONIZATION AMONG ACCESS POINTS IN RADIO ACCESS NETWORK

PRIORITY

This nonprovisional application is a U.S. National Stage filing under 35 U.S.C. § 371 of International Patent Application Serial No. PCT/CN2014/088364 filed Oct. 11, 2014, and entitled "Method and Access Point for Maintaining Synchronization Among Access Points in Radio Access Network"

TECHNICAL FIELD

The present disclosure generally relates to the technical field of wireless communications, and particularly, to a method implemented in an Access Point (AP) for maintaining synchronization among APs in a radio access network as well as the AP.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In order for terminals to properly communicate via a wireless communications network including radio access nodes, it is necessary to establish and maintain synchronization among the radio access nodes.

Some of the wireless communications networks currently deployed, such as Time Division Long Term Evolution (TD-LTE), Time Division-Synchronous Code Division Multiple Access (TD-SCDMA) and Code Division Multiple Access 2000 (CDMA2000) networks, rely on the Global Positioning System (GPS) to achieve synchronization. To be specific, each radio access node in the network calibrates its local timing by referring to a GPS reference signal. As a result, all radio access nodes in the network are synchronized to each other.

Additionally or alternatively, various other approaches than GPS may be employed to achieve synchronization among access nodes in wireless communications networks. For example, in Universal Mobile Telecommunications System Terrestrial Radio Access Networks (UTRANs), a Radio Network Controller (RNC) maintains a time reference and Base Stations (BSs) controlled by the RNC synchronize to each other by referring to the time reference. In Wireless Fidelity (WiFi) networks, each Access Point (AP) adjusts its timing by referring to the fastest one of the clocks of other APs it perceives.

To achieve the ultimate goal of mobile broadband which should be the ubiquitous and sustainable provision of non-limiting data rates to everyone and everything at every time, Ultra Dense Network (UDN) has been proposed which is characterized by sufficient provision of APs and operation at very wide bandwidths in the millimeter-wave bands.

Instead of wired connections arranged between radio access nodes in traditional cellular networks for those nodes to communicate with each other, wireless backhauls are provided in UDNs to support flexibility in the deployment of APs while minimize the cost for the deployment. Accordingly, wireless backhaul based synchronization schemes have been particularly proposed to achieve time synchronization as well as frequency synchronization among APs in the UDNs.

Figure 1:
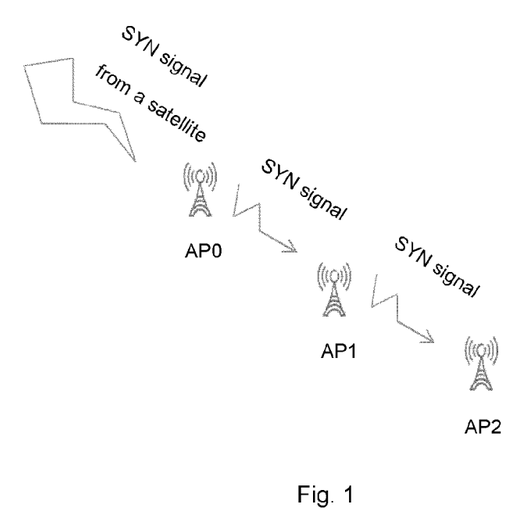
FIG. 1 is a schematic diagram illustrating how APs in a UDN are synchronized according to an exemplary wireless backhaul based synchronization scheme in the prior art.

According to an example of the existing wireless backhaul based synchronization scheme as illustrated in FIG. 1, one of multiple APs in a UDN (denoted as AP0) which can receive an external synchronization signal from a satellite selects the satellite as an external synchronization source and synchronizes to the synchronization source by referring to the external synchronization signal. Meanwhile, AP0's neighboring AP (denoted as AP1) selects AP0 as its local synchronization source and synchronizes to AP0 by referring to a synchronization signal transmitted by AP0. Likewise, another one of AP1's neighboring APs (denoted as AP2) selects AP1 as its local synchronization source and synchronizes to AP1 by referring to a synchronization signal transmitted from AP1, and so on. In this manner, a synchronization chain is formed from AP0 to APn ($n \geq 2$) along which inter-AP synchronization signals are propagated and AP1 to APn are synchronized to AP0 directly or indirectly by referring to the respective inter-AP synchronization signals.

Although many solutions to the problem of how an AP may determine its local synchronization source have been proposed in the prior art (see CN102440031A and CN102625439), there is lack of a mechanism that ensures proper propagation of inter-AP synchronization signals among APs for maintaining synchronization among the APs.

SUMMARY

In view of the foregoing, an object of the present disclosure is to provide a solution which ensures proper propagation of inter-AP synchronization signals among APs for maintaining synchronization among the APs.

According to a first aspect of the present disclosure, there is provided a method implemented in an AP for maintaining synchronization among APs in a radio access network. The method comprises at least one of a transmission step and a reception step. At the transmission step, a first inter-AP synchronization signal is transmitted to a first neighboring AP, which synchronizes to the AP, at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP. The reception resource indicated by the second synchronization signal transmission/reception pattern overlaps with the transmission resource indicated by the first synchronization signal transmission/reception pattern. At the reception step, a second inter-AP synchronization signal is received from a second neighboring AP, to which the AP synchronizes, at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP. The reception resource indicated by the first synchronization signal transmission/reception pattern overlaps with the transmission resource indicated by the third synchronization signal transmission/reception pattern.

According to a second aspect of the present disclosure, there is provided an AP for maintaining synchronization among APs in a radio access network. The AP comprises at least one of a transmission section and a reception section. The transmission section is configured to transmit a first inter-AP synchronization signal to a first neighboring AP, which synchronizes to the AP, at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP. The reception resource indicated by the second synchronization signal transmission/reception pattern overlaps with the transmission resource indicated by the first synchronization signal transmission/reception pattern. The reception section is configured to receive a second inter-AP synchronization signal from a second neighboring AP, to which the AP synchronizes, at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP. The reception resource indicated by the first synchronization signal transmission/reception pattern overlaps with the transmission resource indicated by the third synchronization signal transmission/reception pattern.

Since a reception resource indicated by the second synchronization signal transmission/reception pattern associated with the first neighboring AP overlaps with a transmission resource indicated by the first synchronization signal transmission/reception pattern, it overlaps with no reception resource indicated by the first synchronization signal transmission/reception pattern. Accordingly, proper propagation of the first inter-AP synchronization signal from the AP to the first neighboring AP can be ensured by transmitting the first inter-AP synchronization signal from the AP at the transmission resource indicated by the first synchronization signal transmission/reception pattern and meanwhile receiving the first inter-AP synchronization signal by the first neighboring AP at the reception resource indicated by the second synchronization signal transmission/reception pattern.

Likewise, since a reception resource indicated by the first synchronization signal transmission/reception pattern overlaps with a transmission resource indicated by the third synchronization signal transmission/reception pattern, it overlaps with no reception resource indicated by the third synchronization signal transmission/reception pattern. Accordingly, proper propagation of the second inter-AP synchronization signal from the second neighboring AP to the AP can be ensured by transmitting the second inter-AP synchronization signal from the second neighboring AP at the transmission resource indicated by the third synchronization signal transmission/reception pattern and meanwhile receiving the second inter-AP synchronization signal by the AP at the reception resource indicated by the first synchronization signal transmission/reception pattern.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used in the context of UDN is used in this disclosure to exemplify the embodiments, this should not be seen as limiting the scope of the techniques to only the aforementioned system. Other wireless systems and radio access networks to which wireless backhaul based synchronization techniques are applicable may also benefit from exploiting the ideas covered within this disclosure. Thus, the term "AP" as used herein should be understood to refer more broadly to any kind of wireless communication station capable of performing direct wireless communications with more than one terminals, and the term "terminal" should be understood to encompass not only end-user wireless devices designed to be used by human beings for wirelessly communicating voice and/or data (such as mobile telephones, smartphones, wireless-enabled tablets or personal computers, and the like) but also end-application wireless devices enabled to wirelessly communicate data without human involvement (such as wireless machine-to-machine units, and the like). In addition, the term "synchronization signal" should be understood more broadly to refer to any kind of signals that may carry synchronization reference information, including pilots and preambles as well.

As the inventor of the present application notices, AP1 in FIG. 1 disables its transmission of inter-AP synchronization signal to AP2 when it performs reception of inter-AP synchronization signal from AP0. This may lead to failed inter-AP synchronization signal propagation in certain cases.

By way of example, in a case where AP1 is attempting to receive an inter-AP synchronization signal from AP0 while AP2 is attempting to receive an inter-AP synchronization signal from AP1, propagation of inter-AP synchronization signal from AP1 to AP2 would fail because the transmission of inter-AP synchronization signal from AP1 is disabled when AP1 is receiving an inter-AP synchronization signal from AP0.

To avoid such undesirable cases, solutions which ensure proper propagation of inter-AP synchronization signals among APs for maintaining synchronization among the APs are proposed here.

Figure 2:
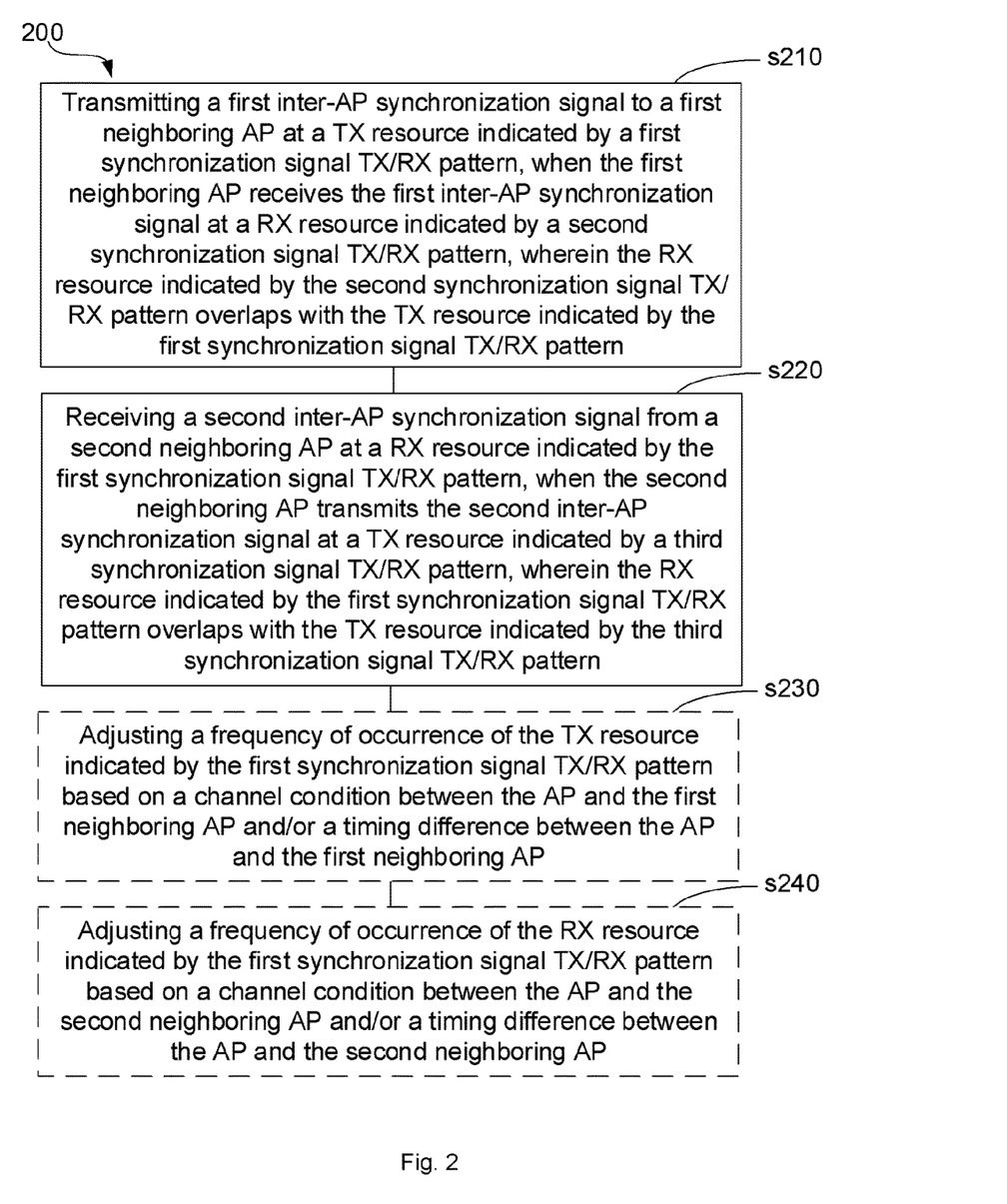
FIG. 2 is a flowchart illustrating a method implemented in an AP for maintaining synchronization among APs in a radio access network according to the present disclosure.

FIG. 2 schematically illustrates a method 200 implemented in an AP for maintaining synchronization among APs in a radio access network according to the present disclosure.

Depending on whether the AP in which the method 200 is implemented has a first neighboring AP which synchronizes to the AP and/or whether the AP has a second neighboring AP to which the AP synchronizes, the method 200 may comprise either or both of a transmission step s210 for transmitting a first inter-AP synchronization signal from the AP to its first neighboring AP and a reception step s220 for receiving a second inter-AP synchronization signal by the AP from its second neighboring AP.

Taking the specific AP deployment illustrated in FIG. 1 as an example, the method 200 implemented in AP1 may comprise both the transmission step s210 and the reception step s220, since AP1 has AP2 and AP0 as its first and second neighboring APs respectively. By contrast, the method 200 if implemented in AP0 may comprise only the transmission step s210 since AP0 has AP1 as its first neighboring AP but has no AP as its second neighboring AP, and the method 200 if implemented in AP2 may comprise only the reception step s220 since AP2 has no AP as its first neighboring AP but has AP1 has its second neighboring AP.

At the transmission step s210, a first inter-AP synchronization signal is transmitted from the AP to its first neighboring AP at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP. The reception resource indicated by the second synchronization signal transmission/reception pattern overlaps with the transmission resource indicated by the first synchronization signal transmission/reception pattern.

At the reception step s220, a second inter-AP synchronization signal is received by the AP from its second neighboring AP at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP. The reception resource indicated by the first synchronization signal transmission/reception pattern overlaps with the transmission resource indicated by the third synchronization signal transmission/reception pattern.

Since a reception resource indicated by the second synchronization signal transmission/reception pattern associated with the first neighboring AP overlaps with a transmission resource indicated by the first synchronization signal transmission/reception pattern, it overlaps with no reception resource indicated by the first synchronization signal transmission/reception pattern. Accordingly, proper propagation of the first inter-AP synchronization signal from the AP to the first neighboring AP can be ensured by transmitting the first inter-AP synchronization signal from the AP at the transmission resource indicated by the first synchronization signal transmission/reception pattern and meanwhile receiving the first inter-AP synchronization signal by the first neighboring AP at the reception resource indicated by the second synchronization signal transmission/reception pattern.

Likewise, since a reception resource indicated by the first synchronization signal transmission/reception pattern overlaps with a transmission resource indicated by the third synchronization signal transmission/reception pattern, it overlaps with no reception resource indicated by the third synchronization signal transmission/reception pattern. Accordingly, proper propagation of the second inter-AP synchronization signal from the second neighboring AP to the AP can be ensured by transmitting the second inter-AP synchronization signal from the second neighboring AP at the transmission resource indicated by the third synchronization signal transmission/reception pattern and meanwhile receiving the second inter-AP synchronization signal by the AP at the reception resource indicated by the first synchronization signal transmission/reception pattern.

By way of illustration rather than limitation, the synchronization signal transmission/reception patterns associated with the AP and its first and second neighboring APs may be respectively determined based on AP IDs which uniquely identify these APs. In this manner, the undesirable case, where the first synchronization signal transmission/reception pattern collides with the second and/or the third synchronization signal transmission/reception patterns and accordingly a reception resource indicated by the first synchronization signal transmission/reception pattern overlaps with a reception resource indicated by the second and/or the third synchronization signal transmission/reception patterns, can be avoided.

Alternatively, the AP may firstly detect synchronization signal patterns of all its neighboring APs and then determine a synchronization signal transmission/reception pattern, which does not collide with any of the detected synchronization signal transmission/reception patterns, as its own synchronization signal transmission/reception pattern.

In one implementation of the method 200 according to a first embodiment, a synchronization signal used for synchronization of terminals to the AP may be reused as the first inter-AP synchronization signal. Another synchronization signal used for synchronization of terminals to the second neighboring AP may be reused as the second inter-AP synchronization signal.

Figure 3:
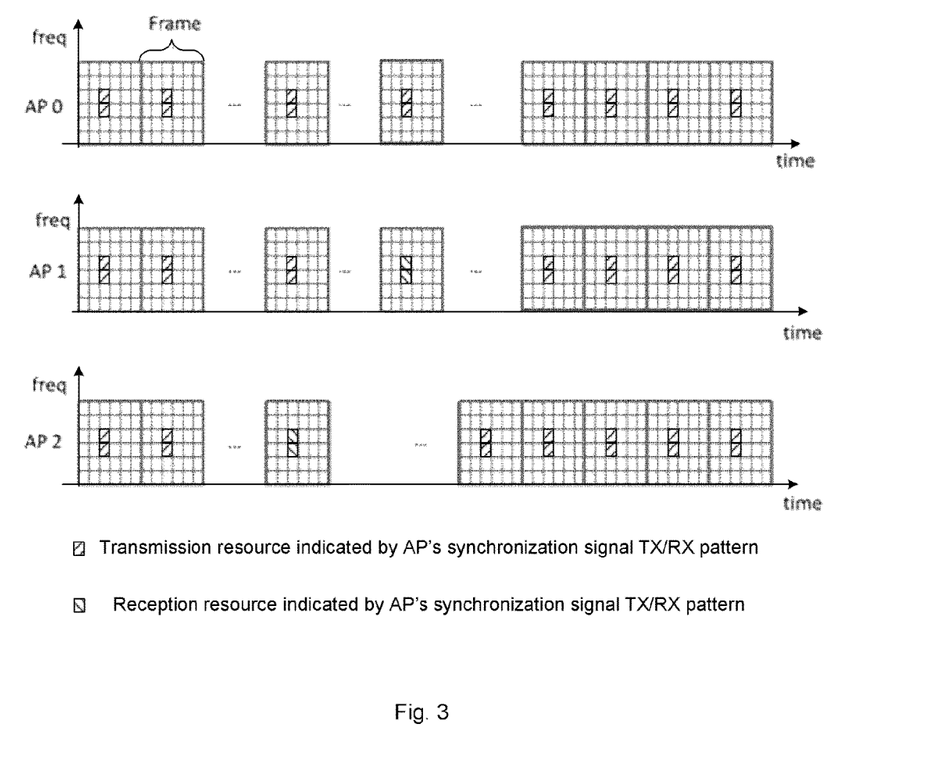
FIG. 3 is a schematic diagram illustrating synchronization signal transmission/reception patterns associated with APs in a UDN according to a first embodiment of the present disclosure.

Taking the specific AP deployment illustrated in FIG. 1 as an example, FIG. 3 illustrates exemplary synchronization signal transmission/reception patterns of AP0-AP2 according to the first embodiment.

Since AP0 serves as a root AP which does not need to synchronize to any other AP at all, AP0's synchronization signal transmission/reception pattern indicates only transmission resources, each of which is denoted in the figure as a block having a frequency dimension and a time dimension. At each of the indicated transmission resources, a synchronization signal used for synchronization of terminals to AP0 is transmitted and this synchronization signal may be reused as an inter-AP synchronization signal received by AP1.

Likewise, at each of transmission resources indicated by AP1's synchronization signal transmission/reception pattern, a synchronization signal used for synchronization of terminals to AP1 is transmitted and this synchronization signal may be reused as an inter-AP synchronization signal received by AP2. In addition, AP1's synchronization signal transmission/reception pattern indicates a reception resource, at which AP1 receives the inter-AP synchronization signal transmitted from AP0 at a corresponding transmission resource indicated by AP0's synchronization signal transmission/reception pattern.

Also, AP2's synchronization signal transmission/reception pattern indicates a plurality of transmission resources and a reception resource. At each of the indicated transmission resources, a synchronization signal used for synchronization of terminals to AP2 is transmitted and this synchronization signal may be reused as an inter-AP synchronization signal received by a further AP that synchronizes to AP2 (if any). At the indicated reception resource, AP2 receives the inter-AP synchronization signal transmitted from AP1 at a corresponding transmission resource indicated by AP0's synchronization signal transmission/reception pattern.

In accordance with the principle of the method 200 as described above, the reception resource indicated by AP2's synchronization signal transmission/reception pattern overlaps with no reception resource indicated by AP1's synchronization signal transmission/reception pattern but overlaps with a transmission resource indicated by AP1's synchronization signal transmission/reception pattern, and the reception resource indicated by AP1's synchronization signal transmission/reception pattern overlaps with no reception resource indicated by AP0's synchronization signal transmission/reception pattern but overlaps with a transmission resource indicated by AP0's synchronization signal transmission/reception pattern, as illustrated in FIG. 3. Accordingly, proper inter-AP synchronization signal propagation can be ensured from AP0 to AP1 and from AP1 to AP2.

Moreover, as illustrated in FIG. 3, the frequency of occurrence of the transmission resource indicated by the synchronization signal transmission/reception pattern of AP1/AP2 may be much lower than the frequency of occurrence of the reception indicated by the AP's synchronization signal transmission/reception pattern. This is because APs are typically fixed in location and accordingly the frequency of receipt of synchronization signal for an AP to maintain synchronization with another AP can be much lower than the frequency of receipt of synchronization signal for a terminal to maintain synchronization with an AP.

In one implementation of the method 200 according to a second embodiment, a dedicated synchronization signal may be used as the first inter-AP synchronization signal and another dedicated synchronization signal may be used as the second inter-AP synchronization signal.

Figure 4:
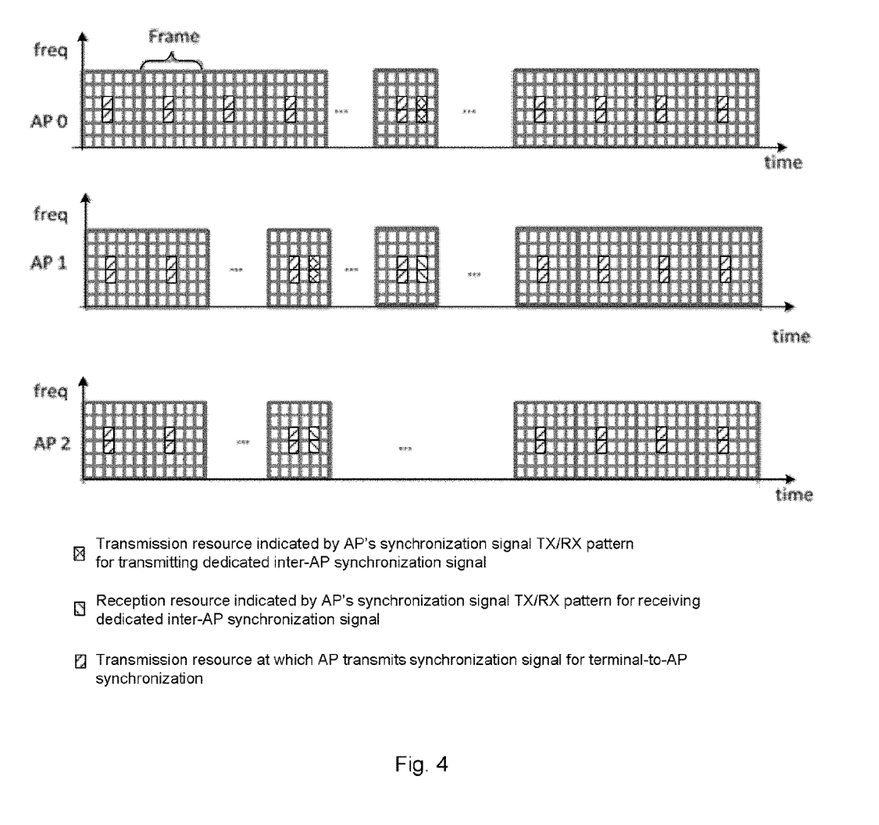
FIG. 4 is a schematic diagram illustrating synchronization signal transmission/reception patterns associated with APs in a UDN according to a second embodiment of the present disclosure.

Taking the specific AP deployment illustrated in FIG. 1 as an example, FIG. 4 illustrates exemplary synchronization signal transmission/reception patterns of AP0-AP2 according to the second embodiment.

In contrast with the exemplary patterns given in FIG. 3, AP0 transmits a dedicated synchronization signal at a transmission resource indicated by AP0's synchronization signal transmission/reception pattern. Meanwhile, AP1 receives the dedicated synchronization signal at a reception resource indicated by AP1's synchronization signal transmission/reception pattern.

Likewise, AP1 transmits a dedicated synchronization signal at a transmission resource indicated by AP1's synchronization signal transmission/reception pattern. Meanwhile, AP2 receives the dedicated synchronization signal at a reception resource indicated by AP2's synchronization signal transmission/reception pattern.

Since AP0 serves as a root AP which does not need to synchronize to any other AP at all, no reception resource is indicated by AP0's synchronization signal transmission/reception pattern for receiving a dedicated synchronization signal. Since there is no AP which synchronizes to AP2, no transmission resource is indicated by AP2's synchronization signal transmission/reception pattern for transmitting a dedicated synchronization signal.

For comparison, transmission resources at which AP0-AP2 transmit synchronization signals used for terminal-to-AP synchronization are also illustrated in FIG. 4.

In accordance with the principle of the method 200 as described above, the reception resource indicated by AP2's synchronization signal transmission/reception pattern for receiving the dedicated synchronization signal overlaps with no reception resource indicated by AP1's synchronization signal transmission/reception pattern for receiving a dedicated synchronization signal but overlaps with a transmission resource indicated by AP1's synchronization signal transmission/reception pattern for transmitting the dedicated synchronization signal, and the reception resource indicated by AP1's synchronization signal transmission/reception pattern for receiving the dedicated synchronization signal overlaps with no reception resource indicated by AP0's synchronization signal transmission/reception pattern for receiving a dedicated synchronization signal but overlaps with the transmission resource indicated by AP0's synchronization signal transmission/reception pattern for transmitting the dedicated synchronization signal, as illustrated in FIG. 4. Accordingly, proper inter-AP synchronization signal propagation can be ensured from AP0 to AP1 and from AP1 to AP2.

As compared with the first embodiment, the solution according to the second embodiment advantageously eliminates adverse effects of the inter-AP synchronization on the terminal-to-AP synchronization by introducing additional overhead for inter-AP synchronization.

In the second embodiment, an AP which synchronizes to another AP may receive, from the other AP, synchronization signals for terminal-to-AP synchronization as well and derive therefrom information (such as the other AP's ID and even the other AP's synchronization signal transmission/reception pattern) assisting in initially determining when to receive, from the other AP, dedicated synchronization signals for inter-AP synchronization.

Moreover, in the second embodiment, an AP serving as the synchronization source of another AP may transmit dedicated synchronization signals to the other AP either autonomously or at the request of the other AP. In addition, the AP may transmit the dedicated synchronization signals to the other AP via a pre-trained beamforming lobe to improve the reception performance at the other AP.

As an enhanced approach applicable to both the first and the second embodiments, the method 200 as illustrated in FIG. 2 may further comprise step s240, at which the AP may adjust a frequency of occurrence of the reception resource indicated by the first synchronization signal transmission/reception pattern based on a channel condition between the AP and the second neighboring AP and/or a perceived timing difference between the AP and the second neighboring AP.

To be specific, if the channel condition between the AP and the second neighboring AP becomes worse and/or if the perceived timing difference between the AP and the second neighboring AP becomes larger, the AP may increase the frequency of occurrence of the reception resource indicated by the first synchronization signal transmission/reception pattern and vice versa.

Figure 5:
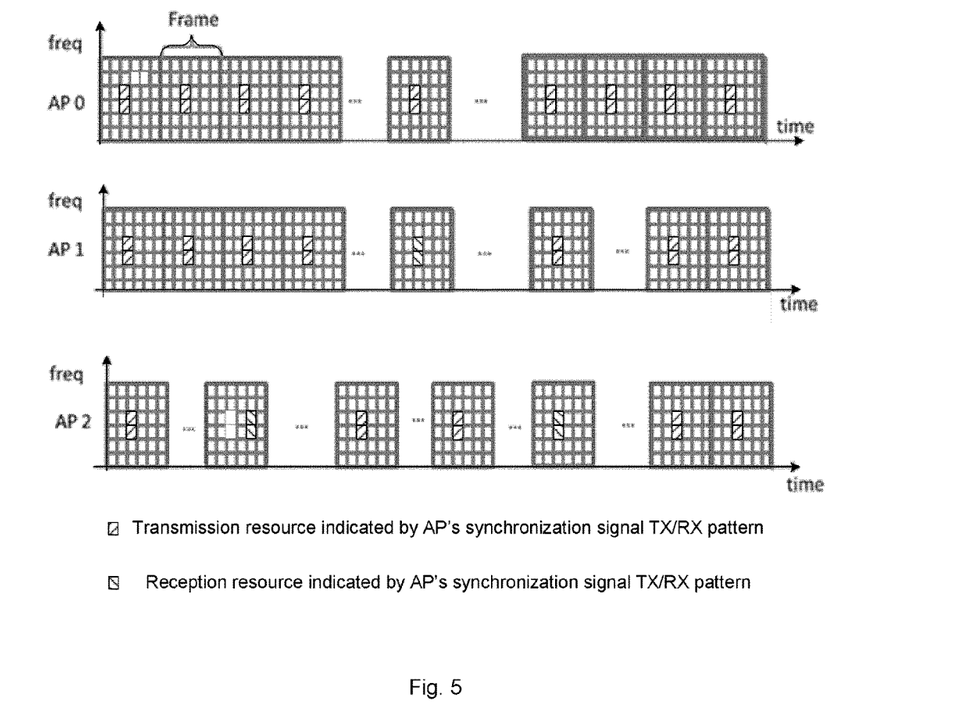
FIG. 5 is a schematic diagram illustrating synchronization signal transmission/reception patterns associated with APs in a UDN according to a third embodiment of the present disclosure.
Figure 6:
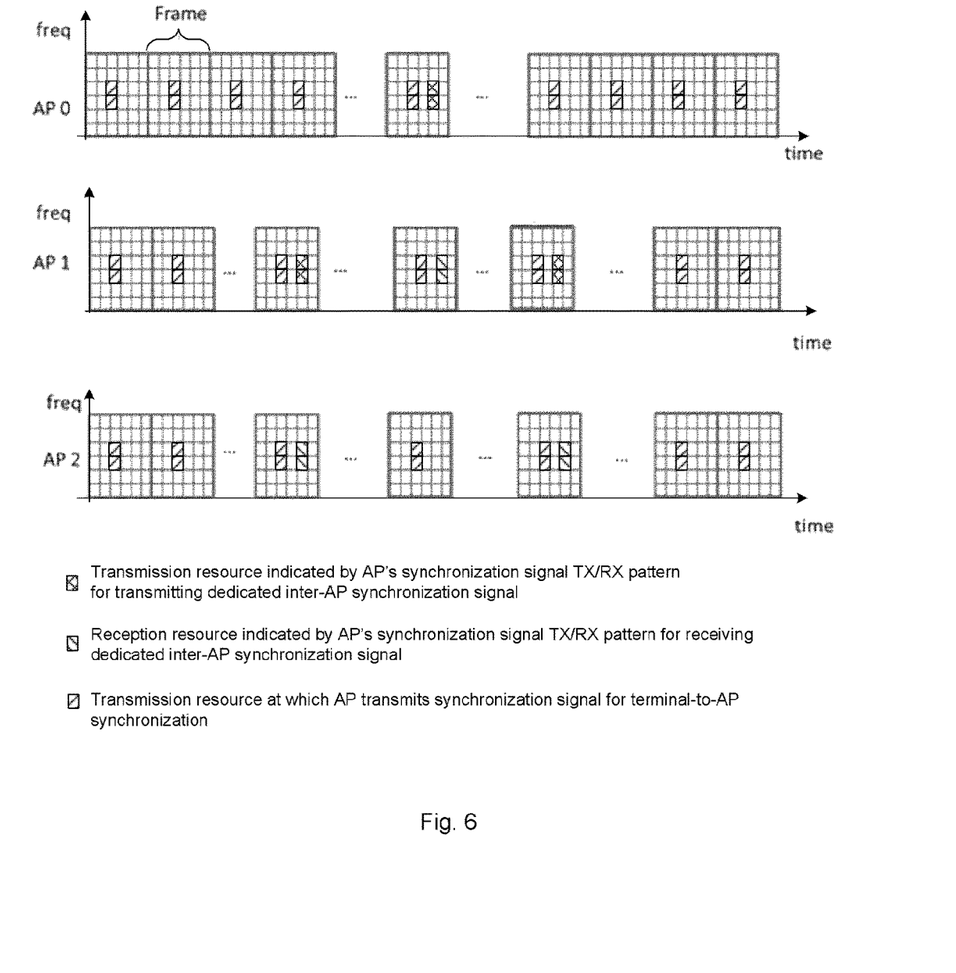
FIG. 6 is a schematic diagram illustrating synchronization signal transmission/reception patterns associated with APs in a UDN according to a fourth embodiment of the present disclosure.

As an example of the application of the enhanced approach, AP2 may increase the frequency of occurrence of the reception resource indicated by its synchronization signal transmission/reception pattern in case the channel condition between AP1 and AP2 degrades, as can be seen from a comparison between FIGS. 3 and 5 and/or a comparison between FIGS. 4 and 6.

In an additional enhanced approach applicable to only the second embodiment, the method 200 as illustrated in FIG. 2 may further comprise step s230, at which the AP may adjust a frequency of occurrence of the transmission resource indicated by the first synchronization signal transmission/reception pattern based on a channel condition between the AP and the first neighboring AP and/or a perceived timing difference between the AP and the first neighboring AP.

To be specific, if the channel condition between the AP and the first neighboring AP becomes worse and/or if the perceived timing difference between the AP and the first neighboring AP becomes larger, the AP may increase the frequency of occurrence of the transmission resource indicated by the first synchronization signal transmission/reception pattern and vice versa.

As an example of the application of the enhanced approach, AP1 may increase the frequency of occurrence of the transmission resource indicated by its synchronization signal transmission/reception pattern in case the channel condition between AP1 and AP2 degrades, as can be seen from a comparison between FIGS. 4 and 6.

By applying the above enhanced approaches, a tradeoff between the accuracy of inter-AP synchronization and the consumption of radio resources for maintaining inter-AP synchronization can be achieved.

As those skilled in the art will appreciate, instead of determining by an AP itself how to adjust the frequency of occurrence of the reception/transmission resource indicated by its synchronization signal transmission/reception pattern, each of APs in a radio access network may report channel conditions and/or perceived timing differences between itself and its neighboring APs to a central control node, which determines in a centralized manner how the APs may adjust the frequencies of occurrence of the reception/transmission resource indicated by their synchronization signal transmission/reception patterns.

Figure 7:
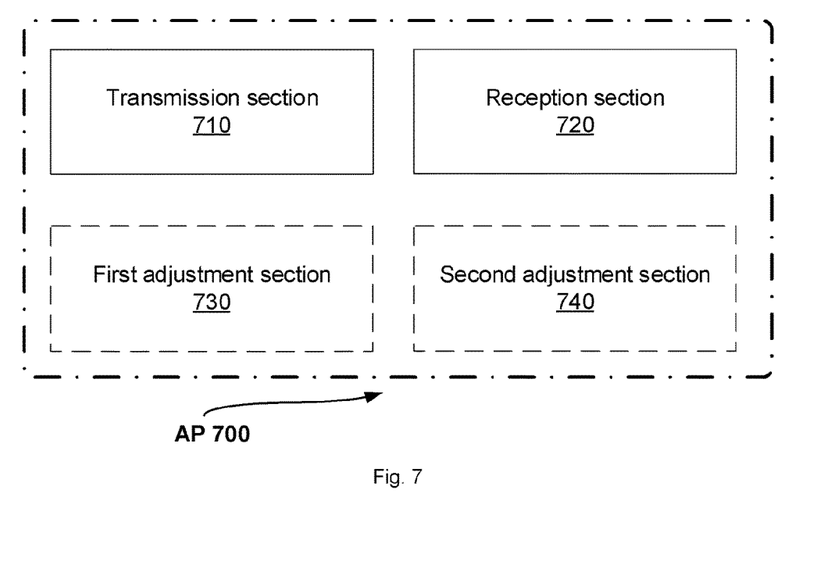
FIG. 7 is a block diagram illustrating a structure of an AP for maintaining synchronization among APs in a radio access network according to the present disclosure.

In the following, a structure of an AP 700 for maintaining synchronization among APs in a radio access network according to the present disclosure will be described with reference to FIG. 7.

As illustrated in the figure, the AP 700 comprises at least one of a transmission section 710 and a reception section 710. The transmission section 710 is configured to transmit a first inter-AP synchronization signal to a first neighboring AP, which synchronizes to the AP, at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP. The reception resource indicated by the second synchronization signal transmission/reception pattern overlaps with the transmission resource indicated by the first synchronization signal transmission/reception pattern. The reception section 720 is configured to receive a second inter-AP synchronization signal from a second neighboring AP, to which the AP synchronizes, at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP. The reception resource indicated by the first synchronization signal transmission/reception pattern overlaps with the transmission resource indicated by the third synchronization signal transmission/reception pattern.

In an embodiment, a synchronization signal used for synchronization of terminals to the AP may be reused as the first inter-AP synchronization signal. Another synchronization signal used for synchronization of terminals to the second neighboring AP may be reused as the second inter-AP synchronization signal.

Alternatively, a dedicated synchronization signal may be used as the first inter-AP synchronization signal. Another dedicated synchronization signal may be used as the second inter-AP synchronization signal.

In this case, the AP 700 may further comprise a first adjustment section 730. The first adjustment section 730 may be configured to adjust a frequency of occurrence of the transmission resource indicated by the first synchronization signal transmission/reception pattern based on a channel condition between the AP and the first neighboring AP and/or a perceived timing difference between the AP and the first neighboring AP.

In an embodiment, the AP 700 may further comprise a second adjustment section 740. The second adjustment section 740 may be configured to adjust a frequency of occurrence of the reception resource indicated by the first synchronization signal transmission/reception pattern based on a channel condition between the AP and the second neighboring AP and/or a perceived timing difference between the AP and the second neighboring AP.

In an embodiment, the synchronization signal transmission/reception patterns associated with the APs may be respectively determined based on the APs' IDs.

As those skilled in the art will appreciate, the above-described sections may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the AP 700 may comprise a transceiver, a memory and a processor (including but not limited to a microprocessor, a microcontroller or a Digital Signal Processor (DSP), etc.) The memory stores machine-readable program code executable by the processor. The processor, when executing the machine-readable program code, controls the transceiver to perform the function of the at least one of the above-described transmission section and reception section.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is clamed is:

1. A method implemented in an Access Point, AP, for maintaining synchronization among APs in a radio access network, the method comprising at least one of the following steps:

transmitting a first inter-AP synchronization signal to a first neighboring AP, which synchronizes to the AP, at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP, wherein the reception resource indicated by the second synchronization signal transmission/reception pattern overlaps with the transmission resource indicated by the first synchronization signal transmission/reception pattern;

receiving a second inter-AP synchronization signal from a second neighboring AP, to which the AP synchronizes, at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP, wherein the reception resource indicated by the first synchronization signal transmission/reception pattern overlaps with the transmission resource indicated by the third synchronization signal transmission/reception pattern; and adjusting a frequency of occurrence of the reception resource indicated by the first synchronization signal transmission/reception pattern based on at least one of a channel condition between the AP and the second neighboring AP or a timing difference between the AP and the second neighboring AP.

2. The method of claim 1, wherein
   a synchronization signal used for synchronization of terminals to the AP is reused as the first inter-AP synchronization signal, and
   another synchronization signal used for synchronization of terminals to the second neighboring AP is reused as the second inter-AP synchronization signal.

3. The method of claim 1, wherein
   a dedicated synchronization signal is used as the first inter-AP synchronization signal, and
   another dedicated synchronization signal is used as the second inter-AP synchronization signal.

4. The method of claim 3, further comprising:
   adjusting a frequency of occurrence of the transmission resource indicated by the first synchronization signal transmission/reception pattern based on a channel condition between the AP and the first neighboring AP and/or a timing difference between the AP and the first neighboring AP.

5. The method of claim 1, wherein the synchronization signal transmission/reception patterns associated with the APs are respectively determined based on the APs' IDs.

6. An Access Point, AP, for maintaining synchronization among APs in a radio access network, the AP comprising at least one of:

a transmission section configured to transmit a first inter-AP synchronization signal to a first neighboring AP, which synchronizes to the AP, at a transmission resource indicated by a first synchronization signal transmission/reception pattern associated with the AP, when the first neighboring AP receives the first inter-AP synchronization signal at a reception resource indicated by a second synchronization signal transmission/reception pattern associated with the first neighboring AP, wherein the reception resource indicated by the second synchronization signal transmission/reception pattern overlaps with the transmission resource indicated by the first synchronization signal transmission/reception pattern;

a reception section configured to receive a second inter-AP synchronization signal from a second neighboring AP, to which the AP synchronizes, at a reception resource indicated by the first synchronization signal transmission/reception pattern, when the second neighboring AP transmits the second inter-AP synchronization signal at a transmission resource indicated by a third synchronization signal transmission/reception pattern associated with the second neighboring AP, wherein the reception resource indicated by the first synchronization signal transmission/reception pattern overlaps with the transmission resource indicated by the third synchronization signal transmission/reception pattern; and a first adjustment section configured to adjust a frequency of occurrence of the reception resource indicated by the first synchronization signal transmission/reception pattern based on at least one of a channel condition between the AP and the second neighboring AP or a timing difference between the AP and the second neighboring AP.

7. The AP of claim 6, wherein
   a synchronization signal used for synchronization of terminals to the AP is reused as the first inter-AP synchronization signal, and
   another synchronization signal used for synchronization of terminals to the second neighboring AP is reused as the second inter-AP synchronization signal.

8. The AP of claim 6, wherein
a dedicated synchronization signal is used as the first inter-AP synchronization signal, and
another dedicated synchronization signal is used as the second inter-AP synchronization signal.

9. The AP of any of claim 8, further comprising:
a second adjustment section configured to adjust a frequency of occurrence of the transmission resource indicated by the first synchronization signal transmission/reception pattern based on a channel condition between the AP and the first neighboring AP and/or a timing difference between the AP and the first neighboring AP.

10. The AP of claim 6, wherein the synchronization signal transmission/reception patterns associated with the APs are respectively determined based on the APs' IDs.

* * * * *